Jan. 18, 1949.  E. C. SULLIVAN  2,459,553
SAFETY AND RELIEF VALVE
Filed Oct. 31, 1945
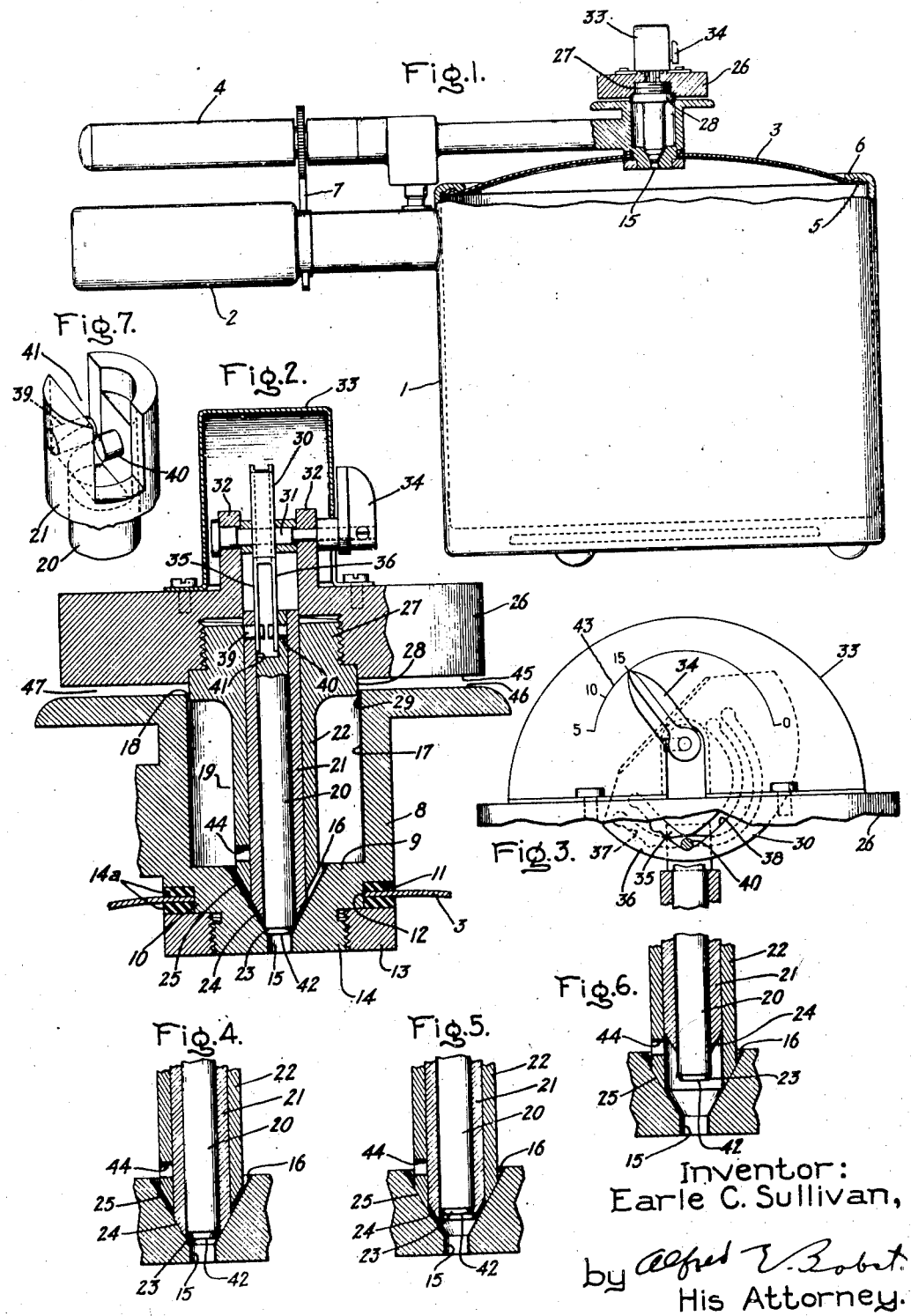
Inventor:
Earle C. Sullivan,
by Alfred V. Robet
His Attorney.

Patented Jan. 18, 1949

2,459,553

UNITED STATES PATENT OFFICE 2,459,553

SAFETY AND RELIEF VALVE

Earle C. Sullivan, Bridgeport, Conn., assignor to General Electric Company, a corporation of New York Application October 31, 1945, Serial No. 625,900

2 Claims. (Cl. 137—53)

1

This invention relates to an improved safety and relief valve structure having the combined functions of a safety, air vent and "blow off" valve, and it has for its object the provision of an improved device of this character.

While not limited thereto, this invention is particularly useful in pressure cookers.

Pressure cooker safety and relief valves have been provided which are set to open at a fixed steam pressure. Some have been arranged so that they also can be operated to vent the air from the cooker at the start of the cooking operation, and also to "blow off" the pressure at the end of the cooking operation. A common arrangement was to use a weight for holding the valve closed against the cooker pressure, the valve being forced from its seat against the force of the weight to open and relieve the pressure when the pressure acting on the valve attained a predetermined high value. The weight chosen operated at the lowest desired pressure. Higher pressures were obtained by using separate heavier weights, or by adding additional weights to the minimum weight. Air or steam could be vented by manually lifting the weight or weights.

This invention contemplates an improved safety and relief valve having but a single fixed weight, but constructed and arranged so that several selected operating pressures can be obtained. Also it contemplates such an improved construction in which air can be vented, and the pressure released from the cooker when it is desired to do so, all in a simple, safe and reliable manner.

In accordance with this invention, the valve is held in its closed position by a single weight against the pressure of the cooker. The valve is constructed and arranged so that the effective area thereof which is acted upon by the pressure is variable. By adjusting this area the valve is caused to operate to release at different cooker pressures.

Also, the valve is constructed and arranged so that the area can be adjusted by the simple manual operation of a control knob and function so that the cooker can be purged of air, or the steam pressure released therefrom by an operation of the control member.

For a more complete understanding of this invention, reference should be had to the accompanying drawing in which Fig. 1 is a side elevation of a pressure cooker embodying a safety and pressure relief valve arranged in accordance with this invention, parts being shown in section so as to illustrate certain details of construction; Fig. 2 is a vertical sectional view through the valve

2 structure of Fig. 1, this view being drawn to a larger scale than Fig. 1; Fig. 3 is a fragmentary side elevation of a part of the structure shown in Fig. 2 and at right angles to the corresponding parts shown in that figure; Figs. 4, 5 and 6 are fragmentary sectional views illustrating the valve structure set to operate at different predetermined cooker pressures; and Fig. 7 is a perspective view of a portion of the valve structure.

Referring to the drawing, this invention has been shown in one form as applied to a pressure cooker comprising a cooking vessel 1 shown as a relatively deep saucepan. The vessel is provided with a handle 2. It also is provided with a cover 3 which is provided with a handle 4. I have illustrated the cooker provided with a cover structure arranged as described in the Vischer Patent No. 2,282,011, dated May 5, 1942. Briefly, this comprises a peripheral sealing edge 5 on the cover which seats against an inturned flange 6 at the top of the cooker vessel, the lid being held in its sealing relation with the flange by means of a hook 7 carried by the cover handle 4 and engaging the vessel handle 2, as shown in Fig. 1.

The safety and pressure relief valve structure arranged in accordance with this invention is mounted in the center of the cover 3, and comprises a valve housing 8 of cylindrical form and having an integral bottom wall 9. The diameter of the lower part of the bottom wall 9 is reduced somewhat so as to define a reduced extension 10 joined to the housing 8 by a shoulder 11. The reduced part 10 is inserted through an opening 12 provided for it in the center of the cover 3, and it is secured to the cover by a nut 13 threaded upon a further reduced section 14 extending down from the bottom wall 9. The joint between the valve structure and the cover 3 is made pressure proof by means of a pair of elastic sealing washers 14a, one interposed between the shoulder 11 and the top surface of the cover, and the other interposed between the bottom surface of the cover and the nut 13, all as shown most clearly in Fig. 2.

In the reduced section 14 there is located a steam vent or discharge passageway 15 which at its lower end communicates with the interior of the closed cooker, as shown, and the upper end of which constitutes a discharge port. Flaring upwardly and outwardly from this discharge port is a conical valve seat 16 which opens into a discharge chamber 17 formed in the housing 8. The upper end of this chamber 17 has a discharge opening 18.

The discharge port of passageway 15 is controlled by a valve structure 19 comprising an inner valve rod 20, an outer sleeve member 21 in telescopic relation with the rod, and a second outer sleeve 22 in telescopic relation with the sleeve 21. The lower ends of the three members 20, 21 and 22 form valve structures cooperating with the conical seat 16. As shown, the rod 20 has a tapered valve seat section 23 at its lower end, while the sleeves 21 and 22, have seat sections 24 and 25 respectively at their lower ends, all three seat sections being formed as sections of a cone complementary to the conical seat 16.

The valve sections 20, 21 and 22 are biased toward the seat by means of a fixed weight 26 in the form of a flat wide disk, as shown. This weight is threaded upon an enlarged cylindrical section 27 formed at the top of the outer sleeve 22. This outer sleeve 22 also is provided with an enlarged cylindrical part 28 located in the top of the chamber 17. This section 28 fits loosely in the chamber so as to provide a slight clearance space 29 between the two members; this space 29 constitutes a port through which the gases of the pressure cooker vent to the atmosphere after being released by the valve structure.

The valve members 20, 21 and 22 are selectively operable away from the valve seat 16 by mechanically controlled means in order to vary the effective area of the valve which is exposed to the cooker pressure. For this purpose a cam 30 is provided. This cam is mounted upon and secured to a shaft 31 which is journaled in spaced upright ears 32 positioned on opposite sides of the cam and formed on the upper side of the weight 26, as shown. The cam is enclosed by a protective housing 33, and it is operated by a knob 34 located on the exterior of the housing and attached to the shaft 31.

The cam 30 is provided with a pair of operating sections 35 and 36 provided respectively with races 37 and 38 in which pins 39 and 40 on the respective valve sections 21 and 20 are received. As shown, the upper end of the sleeve 21 is provided with a recess 41 which receives the cam sections 35 and 36, and in which the pin 39 is located so as to be received in its race 37. It will also be observed that the upper end of the rod 20 extends into the recess 41 so that its pin 40 likewise is located in this recess and so as to be received in its race 38.

When the operating knob 34 is rotated it operates the cam 30 so as to selectively move the valve sections 20, 21 and 22 into and out of contact with the valve seat 16. When the knob 34 is in its position shown in Fig. 3, it sets the valve structure for the maximum cooking pressure. And it does this by operating the cam 30 to force the inner valve rod 20 down against the seat 16 and to lift the sleeves 21 and 22 out of contact therewith. It will be understood that the cam slot 38 will be so shaped that when the knob 34 is rotated clockwise to its high pressure position of Fig. 3 it will first cause the rod 20 to engage the valve seat 16, and then upon its continued motion to the high pressure position will force the outermost sleeve 22 upwardly away from the seat; and it will be further understood that the valve race 37 will be so shaped that when the knob is moved to this position it will elevate the central sleeve 21. When the valve is so set only the flat circular area 42 at the lower end of the rod is exposed to the pressure in the cooker. Consequently, the pressure must rise to a relatively high value in order to overcome the weight 26 before the valve is opened to release the pressure into the chamber 17 and out through the opening 29.

To obtain a lower pressure the knob 34 is moved counterclockwise (Fig. 3) to an intermediate pressure position in which the cam races 37 and 38 cause the central sleeve 21 only to contact the valve seat 16, while the rod 20 and the outer sleeve 22 are elevated from the seat, all as shown in Fig. 4. The effective area of the valve now exposed to the cooker pressure is the sum of the area 42 and the area of the seat section 23 on the bottom of the rod 20. Since the combined area is greater than the area 42, a lower cooker pressure is required to elevate the valve structure against the force of the weight 26 to release the cooker pressure.

A still lower cooker pressure is obtained by operating the knob 34 counterclockwise to a lower pressure position; this operation causes the races 37 and 38 to elevate the rod 20 and the sleeve 21, thereby permitting only the sleeve 22 to engage the valve seat 16, as shown in Fig. 5. This adds the conical surface 24 of the sleeve 21 to the surfaces 42 and 23 and thereby gives the maximum surface of the valve exposed to the cooker pressure. Consequently, the lowest pressure of the cooker is obtained at the time the valve opens to release.

Preferably, a pressure scale 43 reading in pounds per square inch will be provided on the outer wall of the casing 33 opposite the knob 34 to assist in setting the knob.

In starting up a pressure cooker from a cold condition it is desired to vent entrapped heated air from the cooker; and at the end of the cooking operation, it is desired to blow off the steam pressure. I accomplish both of these operations by forming in the outer valve sleeve 22 a vent port 44 adjacent its lower end. Normally, this is closed by the sleeve 21, but when it is desired to either bleed the air from the cooker or to blow the steam off from it, the knob 34 is operated to a position indicated "0" on the pressure scale 43. When the knob is moved to this position the cam 30 is operated to elevate the rod 20 and the sleeve 21 to open the passageway 15 to the sleeve 22 and to uncover the port 44, thereby permitting the cooker to vent through the opening 44.

The building up of pressure in the cooker tends to force the valve weight 26 into the air and out of its proper position. This is prevented by providing the bottom of the weight 26 with a flat horizontal smooth surface 45 which is relatively large in area, and providing opposite it a second similar surface 46 fixed to the valve housing 8. These two surfaces are relatively close together so as to define a narrow space 47 between them. This space at its central part communicates with the vent passageway 29 and at its outer periphery opens to the atmosphere. The valve structure is such that just after the valve opens the seat 16, the cylinder 28 clears the upper edge of the bore 29 to vent to the atmosphere. Gases escaping through the bore 29 pass into the narrow space 47 at its central part and then move radially outwardly in all directions to the outer periphery of the discharge space 47. Because of this arrangement, the steam as it moves outwardly into and through the space 47 greatly increases its velocity. And because of this increase in velocity "draws" the weight 26 downwardly through the phenomena known as the Bernoulli effect. This briefly is that in a flowing stream the sum of the velocity, pressure and elevation heads at one point is always equal to their sum at any other point removed in the direction of flow from the first point, neglecting the loss due to friction between these points.

While I have shown and described a particular embodiment of my invention, it will be obvious to those skilled in the art that various changes and modifications may be made without departing from my invention in its broader aspects and I therefore aim in the appended claims to cover all such changes and modifications as fall within the true spirit and scope of my invention.

What I claim as new and desire to secure by Letters Patent of the United States, is:

1. A pressure relief valve comprising a housing having a pressure relief passage one end of which is adapted for connection with a source of pressure, and the other end of said passage constituting a release port, a valve seat at said other end opening into said port, a valve seating on said seat to close said port, said valve having an outer tubular member having at its bottom end a sealing section complementary to said seat and adapted to seat thereon, a fixed weight attached to said tubular member biasing it into engagement with said seat, a plurality of inner telescopically arranged valve seat members mounted within and telescoping with said tubular member and having at their lower ends sealing sections complementary to said seat and adapted to seat thereon in sealing relation, and operating means for selectively moving said tubular member and said inner members vertically out of engagement with said seat so as to vary the effective area of said valve exposed to the pressure in said passage.

2. A pressure relief valve comprising a housing having a pressure relief passage one end of which is adapted for connection with a source of pressure, and the other end of said passage constituting a pressure release port, a valve seat at said other end opening into said port, a valve seating on said seat to close said port, said valve having an outer tubular member having at its bottom end a sealing section complementary to said seat and adapted to seat thereon, means biasing said tubular member into engagement with said seat with a substantially constant predetermined force, a plurality of inner telescopically arranged valve seat members mounted within and telescoping with said tubular member and having at their lower ends sealing sections complementary to said seat and adapted to seat thereon in sealing relation, operating means for selectively moving said tubular member and said inner members vertically out of engagement with said seat so as to vary the effective area of said valve exposed to the pressure in said passage, and said outer tubular member having a vent port in its side wall above its bottom end, said vent port normally being closed by the adjacent inner valve seat member and opened when said adjacent inner member is moved vertically to a predetermined position by said operating means.

EARLE C. SULLIVAN.

REFERENCES CITED

The following references are of record in the file of this patent:

UNITED STATES PATENTS

| Number | Name | Date |
| --- | --- | --- |
| 253,622 | Pearson | Feb. 14, 1882 |
| 293,685 | Thomas | Feb. 19, 1884 |
| 1,166,884 | Bergo | Jan. 4, 1916 |
| 1,231,330 | Clark | June 26, 1917 |
| 1,560,829 | Kraut | Nov. 10, 1925 |
| 1,773,268 | Jenkins | Aug. 19, 1930 |
| 2,422,237 | Hansen | June 17, 1947 |